(12) United States Patent
Bader

(10) Patent No.: US 7,565,847 B2
(45) Date of Patent: Jul. 28, 2009

(54) DEVICE FOR PREVENTING WOBBLING OF THE PICK-UP GEARS IN A GEARBOX WITH TWO LAYSHAFTS

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 337 days.

(21) Appl. No.: 10/591,028

(22) PCT Filed: Feb. 8, 2005

(86) PCT No.: PCT/EP2005/001233

§ 371 (c)(1),
(2), (4) Date: Aug. 29, 2006

(87) PCT Pub. No.: WO2005/085681

PCT Pub. Date: Sep. 15, 2005

(65) Prior Publication Data

US 2007/0151382 A1 Jul. 5, 2007

(30) Foreign Application Priority Data

Mar. 3, 2004 (DE) .................... 10 2004 010 270

(51) Int. Cl.
*F16H 3/08* (2006.01)
*F16H 55/18* (2006.01)
(52) U.S. Cl. .................. 74/331; 74/409; 74/440
(58) Field of Classification Search .......... 74/331, 74/409, 440
See application file for complete search history.

(56) References Cited

U.S. PATENT DOCUMENTS

| 3,035,454 A | * | 5/1962 | Luning ................... 74/440 |
| 4,811,615 A | * | 3/1989 | Rea ................... 74/375 |
| 4,881,422 A | * | 11/1989 | Maguire ................... 74/440 |
| 5,257,543 A | | 11/1993 | Fogelberg |
| 6,047,607 A | * | 4/2000 | Weber et al. ................... 74/409 |
| 6,073,506 A | * | 6/2000 | Wireman ................... 74/331 |
| 6,427,547 B1 | * | 8/2002 | Bowen ................... 74/329 |
| 7,007,565 B2 | * | 3/2006 | Allen et al. ................... 74/333 |
| 2004/0053740 A1 | | 3/2004 | Wodtke |

FOREIGN PATENT DOCUMENTS

| DE | 37 08 100 A1 | 9/1988 |
| DE | 43 29 851 A1 | 3/1994 |
| DE | 199 50 048 A1 | 4/2001 |
| DE | 103 28 482 A1 | 1/2004 |
| EP | 0 361 686 A1 | 4/1990 |
| JP | 59080563 A * | 5/1984 |
| JP | 59-175672 | 10/1984 |

* cited by examiner

*Primary Examiner*—Ha D. Ho
(74) *Attorney, Agent, or Firm*—Davis & Bujold, P.L.L.C.

(57) ABSTRACT

A device to prevent wobbling of cog wheels (3) arranged on a main shaft (6) in a transmission train with two countershafts (1, 2), which has at the minimum, a disk (7) for one of the cog wheels that is connected with the respective cog wheel (3) and/or is supported on the face side of a gearing (8) of the countershafts (1, 2) or on intermediate shafts (12) for the reverse gears, whereby the respective cog wheel (3) is pushed by the spring action against the disk (7).

13 Claims, 2 Drawing Sheets

DEVICE FOR PREVENTING WOBBLING OF THE PICK-UP GEARS IN A GEARBOX WITH TWO LAYSHAFTS

This application is a national stage completion of PCT/EP2005/001233 filed Feb. 8, 2005 which claims priority from German Application Serial No. 10 2004 010 270.8 filed Mar. 3, 2004.

FIELD OF THE INVENTION

This invention concerns a device to prevent the swaying of the cog wheels positioned on the main shaft in a transmission with two countershafts.

BACKGROUND OF THE INVENTION

According to the state of technology, the idle wheels used as cog wheels in transmissions with two countershafts are radially guided into both gearings of the countershafts. The cog wheels are guided on the main shaft in the axial direction by the washer disks, whereby a washer disk of the idler wheel is placed between two washer disks on the main shaft. There thus results the disadvantage that relatively large plays are caused by the work tolerances and the opening required for oil lubrication, so that when the loads of the idler wheels are stimulated because of the swaying movements of the main shaft or the oscillating rotary motion, an unpleasant rattling noise arises.

Within the scope of the EP 0361 686 A1, a transmission with a countershaft is proposed where the countershaft gear wheel of the driving mechanism constant is arranged on the countershaft in such manner that the oscillations of the gear wheel are not transmitted to the countershaft because of a small play arising therefrom as well as because of a dampening element connected to the gear wheel and placed parallel to the countershaft in order that, in this manner, the rattling noise is suppressed as much as possible. This design, however, has proven to be very costly and, furthermore, the vibration noises cannot be fully suppressed, since the additional wheels arranged on the countershaft would be interfering with the corresponding idler wheels of the drive shaft unless additional construction measures were undertaken.

The task of the invention is to provide a device to prevent the swaying of the cog wheels arranged on the main shaft or, as the case may be, to avoid the above noted vibration noises in a power train with two countershafts.

SUMMARY OF THE INVENTION

Accordingly, it is recommended, that for the axially guiding of the cog wheels, an additional disk is provided in addition to the washer disk of the cog wheel placed between the two washer disks arranged on the main shaft, which is rigidly connected to the cog wheel and is braced against the face side of the countershaft gearing or the intermediate shaft for the reverse gear. Hereby, it can be foreseen that the cog wheel will be pressed or, as the case may be, pushed by the spring action against the disk. In the process, a disk can be provided for each cog wheel. It is also conceivable that individual cog wheels may be equipped with the disks of this invention.

Within the context of a first especially advantageous variation of the invention, it is foreseen that the disk has a spring-loaded construction, whereby other designs are possible. Thus, for example, in the context of a second variation, it is foreseen that the disk is connected to the cog wheel by at least one bolt guided through the cog wheel, whereby the bolt pushes the wheel in the direction of the disk due to the installed spring. According to the invention, at least three bolts are foreseen for each wheel; however, their number can vary according to the requirements. In place of bolts, other suitable types of fastener devices may be used.

The angle between the end of the disk of the invention facing the countershaft or, as the case may be, the intermediate shaft for the reverse gear and the perpendicular of the countershaft or, as the case may be, the intermediate shaft for the reverse gear in the radial direction preferably amounts to about 3°, but is positioned perpendicular to the shaft). Preferably, the contact surfaces are of a cone-shaped design. A small angle results in the advantage, that a touch line is produced whereby, at the same time, the effect of a lubricated wedge is reinforced. Furthermore, the contact zones are positioned near the pitch circle, so that the sliding parts are kept advantageously as small as possible.

Using the concept according to the invention, the wobbling of the cog wheels is largely prevented in that they are braced by spring-loaded disks on the mounted countershafts or, as the case may be, the intermediate shafts for the reverse gear.

BRIEF DESCRIPTION OF THE DRAWINGS

The invention will now be described, by way of example, with reference to the accompanying drawings in which.

DETAILED DESCRIPTION OF THE INVENTION

Figure 1:
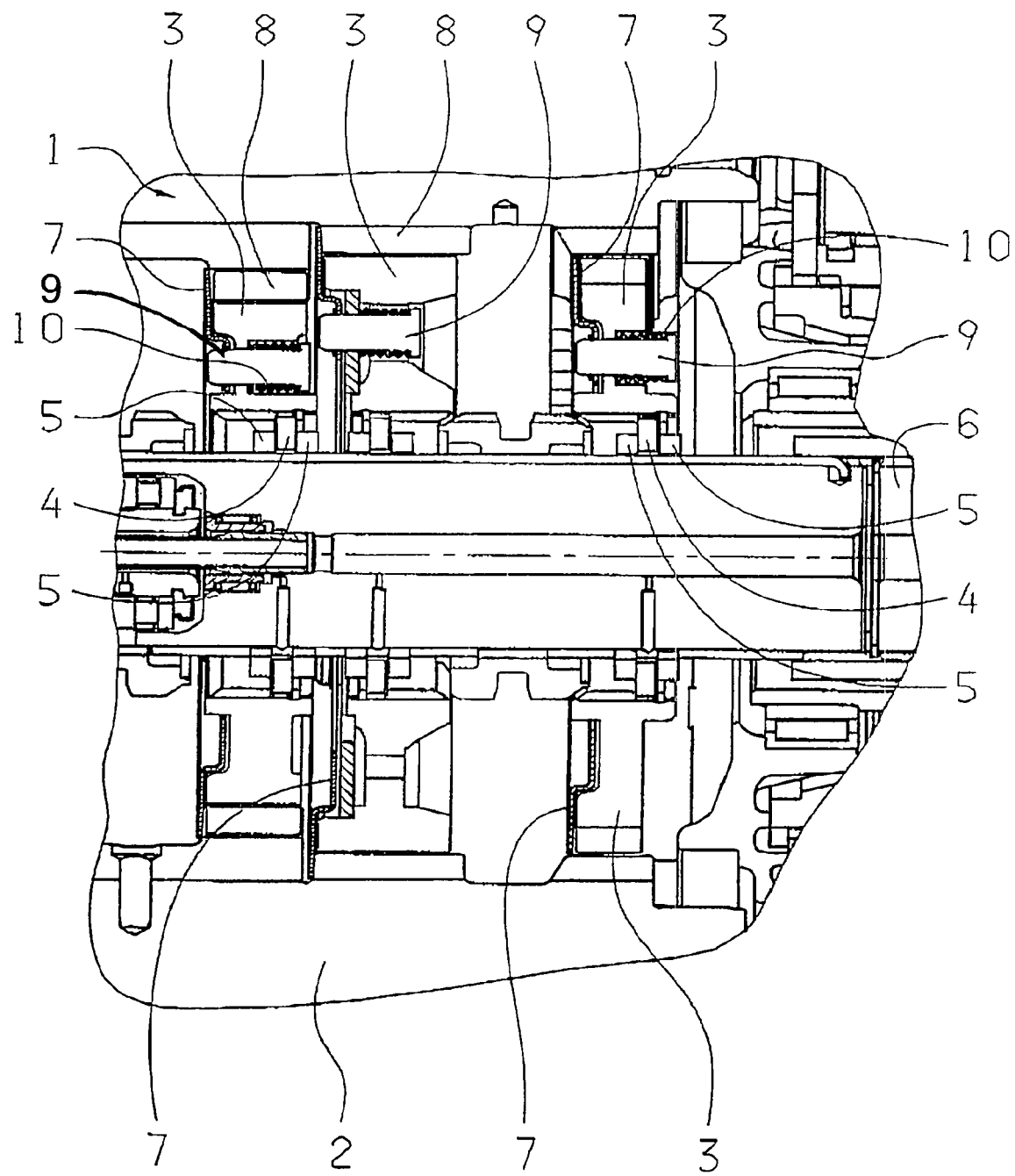
FIG. 1 is a representation of a first, especially advantageous execution model of the device, according to the invention, in which the cog wheels mesh with the gearing of the countershafts.

Only the essential parts of the drawings for the invention have reference symbols. FIG. 1 shows a part of the power train with two countershafts 1, 2, whereby cog wheels 3 are radially guided in both gearings of the countershafts 1, 2. In the axial direction, the cog wheels are guided on a main shaft 6 by washer disks 4, 5, whereby the washer disk 4 of the cog wheel 3 is placed between two washer disks 5 positioned on the main shaft 6.

According to the invention, another disk 7 is provided to avoid the vibration noise of each cog wheel 3 which, on the one hand, is connected with the cog wheels 3 and, on the other hand, is supported on the face side of the gearing 8 of the countershafts 1, 2. In an advantageous manner, the cog wheel 3 is pressed or, as the case may be, pushed against the disk 7 by use of the spring effect, so that the wobbling movements are suppressed.

In the execution example shown in the FIG. 1, the disk 7 is connected to the cog wheel 3 by a bolt 9 guided through the cog wheel 3, whereby the bolt 9 pushes the cog wheel 3 in the direction of disk 7 by way of an installed spring 10. This construction can also be used for the case of the cog wheel which meshes with the intermediate wheels for the reverse gears that are placed on an intermediate shaft.

Figure 2:
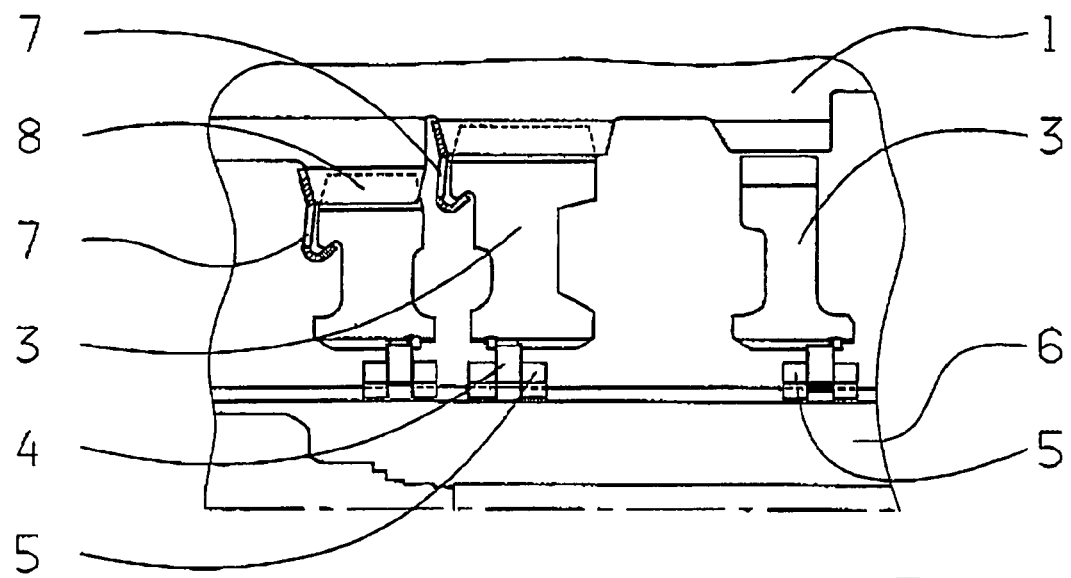
FIG. 2 is a representation of a second, especially advantageous execution model of the device, according to the invention, in which the cog wheels mesh with the gearing of the of the countershafts.

According to FIG. 2, the execution example shows another variation of the disk 7 according to the invention. Here the disk 7 is designed to be spring-loaded, so that the bolt and spring, according to the execution example in FIG. 1, are not needed.

Figure 3:
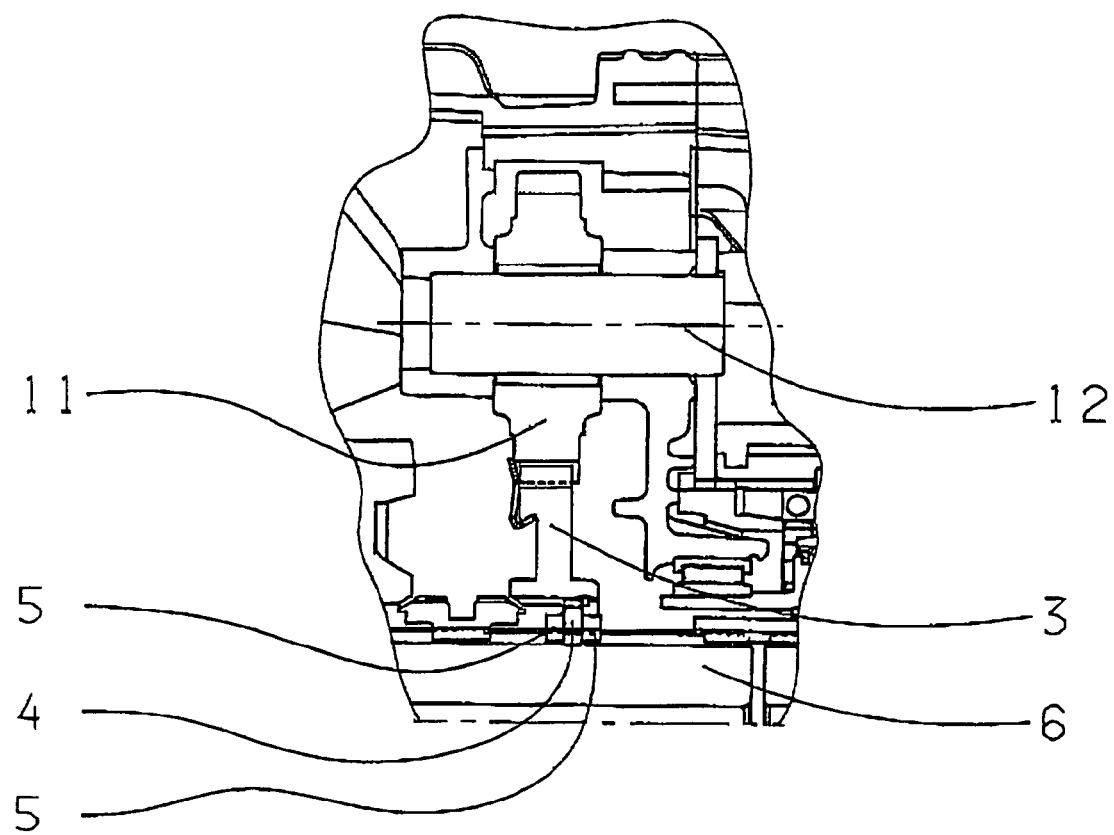
FIG. 3 is a representation of an especially advantageous variation of the device, according to the invention, using the example of the intermediate shafts for the reverse gears.

FIG. 3 shows the concept, according to the invention, using the example of the cog wheel 3 which engages with intermediate wheels 11 for the reverse gears positioned on an intermediate shaft 12. Here the disk 7 has a spring-loaded design.

Naturally, every constructive design, especially each spatial arrangement of the wheels of the disk 7 or, as the case may be, of the spring element, is by itself or together and to the extent that it makes sense technically, under the scope of protection of the submitted claims, without affecting the function of the device, as they are stated in the claims, even when this design is not explicitly represented in the Figures or in the description.

REFERENCE NUMERALS 1 countershaft
2 countershaft
3 cog wheel, idler wheel
4 washer disk
5 washer disk
6 main shaft
7 disk
8 gearing
9 bolt
10 spring
11 gear wheel for the reverse gear
12 intermediate shaft for the reverse gear

The invention claimed is:

1. A device for preventing wobbling of at least one cog wheel (3) supported by a main shaft (6) of a transmission having first and second countershafts (1, 2), and at least one intermediate shaft (12), for a reverse gear; the at least one cog wheel (3) includes a disk (7) which is connected with the at least one cog wheel (3) and is supported, on a side facing a gearing (8) of one of the first countershaft (1), the second countershaft (2) and the intermediate shaft (12) and the at least one cog wheel (3) being biased, by spring action, against the disk (7) to suppress wobbling movement of the at least one cog wheel (3); and a washer disk (4) carried by the at least one cog wheel (3) is sandwiched between a pair of washer disks (5) supported by the main shaft (6).

2. The device according to claim 1, wherein an angle, in a radial direction, between one of an end of the disk (7) facing the one of the first countershaft (1), the second countershaft (2) and the intermediate shaft (12) is approximately 3°.

3. The device according to claim 1, wherein contact surfaces between the disk (7) and the gearing of one of the first and the second countershafts (1, 2) and the intermediate shaft (12) are located near a pitch circle such that sliding surfaces areas of the disk (7) and the gearing can be kept as small as possible.

4. The device according to claim 1, wherein a radially inward annular surface of the disk (7) is bent and engages with a mating annular surface of the at least cog wheel (3) for coupling the at least one cog wheel (3) against the disk (7) to suppress wobbling movement of the at least one cog wheel (3).

5. The device according to claim 1, wherein three bolts (9) fasten the disk (7) to the at least one cog wheel (3).

6. A device for preventing wobbling of at least one cog wheel (3) supported by a main shaft (6) of a transmission having first and second countershafts (1, 2) and at least one intermediate shaft (12), for a reverse gear; the at least one cog wheel (3) includes a disk (7) which is connected with the at least one cog wheel (3) and is supported against a side facing a gearing (8) of one of the first countershaft (1), the second countershaft (2) and the intermediate shaft (12), and the at least one cog wheel (3) being biased, by spring action, against the disk (7);
wherein the disk (7) is connected to the at least one cog wheel (3) by at least one bolt (9) guided through the at least one cog wheel (3), and a spring (10), supported by the at least one bolt (9), pushes the at least one cog wheel (3), in a direction of the disk (7).

7. The device according to claim 6, wherein three bolts (9) fasten the disk (7) to the at least one cog wheel (3).

8. The device according to claim 6, wherein a washer disk (4) carried by the at least one cog wheel (3) is sandwiched between a pair of washer disks (5) supported by the main shaft (6).

9. The device according to claim 6, wherein an angle, in a radial direction, between one of an end of the disk (7) facing the one of the first countershaft (1), the second countershaft (2) and the intermediate shaft (12) is approximately 3°.

10. The device according to claim 6, wherein contact surfaces between the disk (7) and the gearing of one of the first and the second countershafts (1, 2) and the intermediate shaft (12) are located near a pitch circle such that sliding surfaces areas of the disk (7) and the gearing can be kept as small as possible.

11. A device for preventing wobbling of at least one cog wheel (3) supported by a main shaft (6) of a transmission having first and second countershafts (1, 2) and at least one intermediate shaft (12), for a reverse gear; the at least one cog wheel (3) includes a disk (7) which is connected with the at least one cog wheel (3) and is supported against a side facing a gearing (8) of one of the first countershaft (1), the second countershaft (2) and the intermediate shaft (12), and the at least one cog wheel (3) being biased, by spring action, against the disk (7);
wherein contact surfaces between the disk (7) and one of the gearing of one of the first countershaft (1), the second countershaft (2) and the intermediate shaft (12) have a cone-shaped design.

12. The device according to claim 11, wherein a washer disk (4) carried by the at least one cog wheel (3) is sandwiched between a pair of washer disks (5) supported by the main shaft (6).

13. The device according to claim 11, wherein a radially inward annular surface of the disk (7) is bent and engages with a mating annular surface of the at least cog wheel (3) for coupling the at least one cog wheel (3) against the disk (7) to suppress wobbling movement of the at least one cog wheel (3).

* * * * *